Aug. 14, 1951 F. L. MOORE 2,563,860

SOUND RECORDING AND REPRODUCING HEAD

Filed Oct. 11, 1946 5 Sheets-Sheet 1

INVENTOR
FRANK L. MOORE
BY Darby & Darby
ATTORNEYS

Aug. 14, 1951 F. L. MOORE 2,563,860

SOUND RECORDING AND REPRODUCING HEAD

Filed Oct. 11, 1946 5 Sheets-Sheet 2

INVENTOR
FRANK L. MOOR
BY Darby & Darby
ATTORNEYS

Aug. 14, 1951
F. L. MOORE
2,563,860
SOUND RECORDING AND REPRODUCING HEAD
Filed Oct. 11, 1946
5 Sheets-Sheet 3
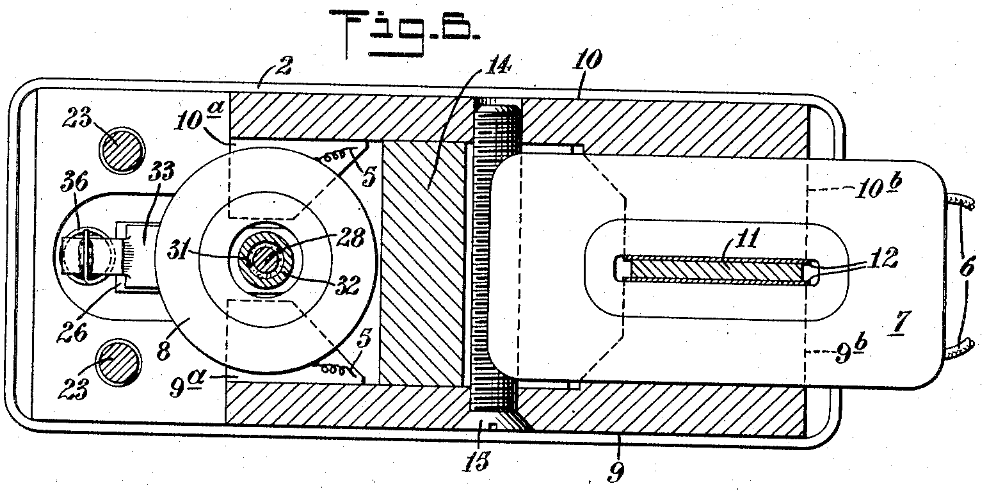
Fig. 6.
Fig. 7.
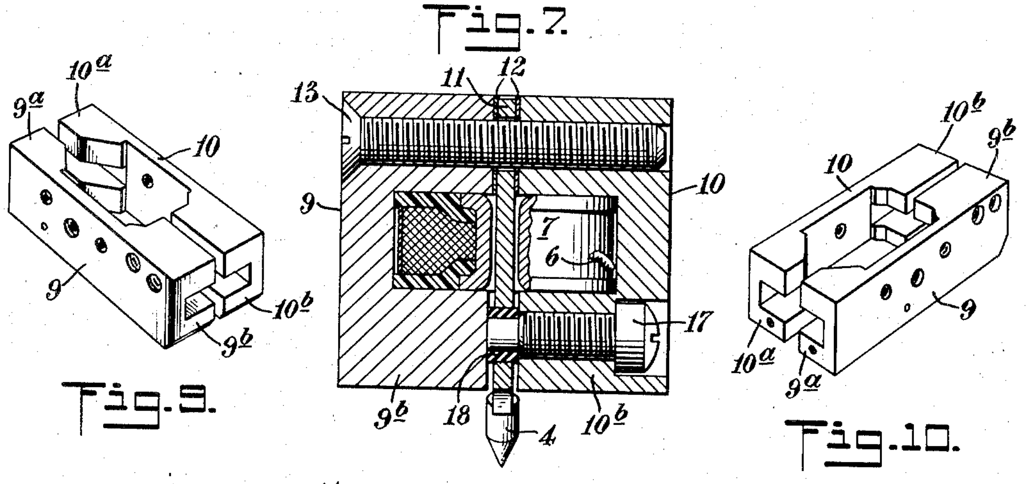
Fig. 9. Fig. 7. Fig. 10.
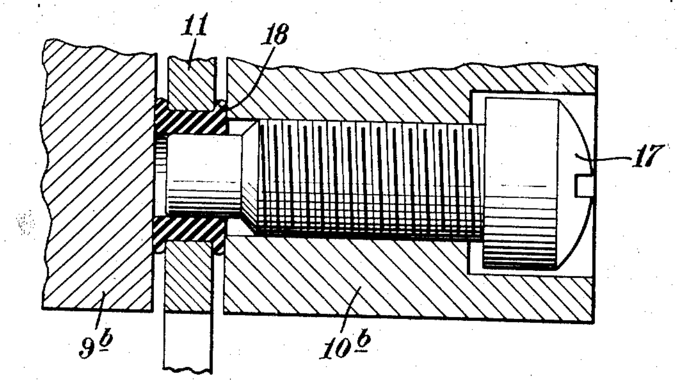
Fig. 8.
INVENTOR
FRANK L. MOORE
BY Darby & Darby
ATTORNEYS Aug. 14, 1951

F. L. MOORE 2,563,860

SOUND RECORDING AND REPRODUCING HEAD

Filed Oct. 11, 1946

5 Sheets-Sheet 4

INVENTOR
FRANK L. MOORE
BY Darby & Darby
ATTORNEYS

SOUND RECORDING AND REPRODUCING HEAD

Filed Oct. 11, 1946

5 Sheets-Sheet 5

INVENTOR
FRANK L. MOORE
BY Darby & Darby
ATTORNEYS

Patented Aug. 14, 1951 2,563,860

UNITED STATES PATENT OFFICE 2,563,860

SOUND RECORDING AND REPRODUCING HEAD

Frank L. Moore, Hartford, Conn., assignor to The Gray Manufacturing Company, Hartford, Conn., a corporation of Connecticut Application October 11, 1946, Serial No. 702,668

22 Claims. (Cl. 179—100.41)

This invention relates to improvements in sound recording and reproducing heads as used in recording and reproducing machines of the phonograph type.

One object of this invention is to provide a sound recording head in which provision is made for compensation for normal variations in the air gap due to manufacturing tolerances and for varying the amount of damping of the vibratory armature of such a unit, and hence the sensitivity of the unit.

Another object of this invention is to produce a sound reproducing unit having a fixed magnetic field structure and a vibratory system capable of conjoint and independent movement about two axes at right angles or less to each other.

A further object is to provide in such a unit a construction wherein the vibratory system can operate about a tracking axis in response to the guiding forces generated by the record groove due to variations in its position with respect to a fixed point such as the center of rotation of the record disc in the case of a disc machine, without causing signal generating movements of the armature which forms a part of the vibratory system, in the air gap.

Another object of the invention is to provide in such a device a signal axis about which the vibratory system may move in response to the modulations of the record grooves to generate the signal and for determining the relative position of that axis which can be termed the signal axis with respect to the tracking axis.

Another object of the invention is the provision of a structure wherein mass proportioning and distribution in relation to damping means are all co-ordinated to insure signal generation over a desired frequency range, and particularly including low-frequency ranges, while permitting response of the vibratory system about the tracking axis in response to the still lower frequencies of the tracking forces.

Another object of the invention is to provide in such a device a vibratory system wherein the mass of the system permits of low frequency response to the tracking forces about the tracking axis without interfering with the low but still higher frequency responses of the system about its signal axis.

A still further object of the invention is to provide in such a unit a vibratory system which does not vibrate about its tracking axis at signal frequencies because of the proportioning and positioning of its actual mass so as to prevent response of the system about the tracking axis in response to the groove modulations, that is in response to signal frequencies.

A still further object is to provide a vibratory system in such a unit which is capable of passing even the very low signal frequencies due to its effective mass which is greater than its true mass by reason of the distribution of the actual mass of the system about its tracking axis.

A further object of the invention is to provide in such a device a vibratory system having two axes of response, a tracking axis, and a signal axis, relatively arranged so that the signal axis is parallel to the record surface, thereby imparting a mechanical advantage for the signal forces generated by the groove modulations.

A still further object of the invention is to provide several forms of centering means for the vibratory system of a recording unit when not subjected to operating forces.

Other and more detailed objects of the invention will be apparent from the following description of the embodiments thereof illustrated in the drawings, including the object of providing an exceedingly compact, rigid and efficient combination unit comprising the recording and reproducing units hereinafter described.

This invention resides substantially in the combination, construction, arrangement and relative location of parts, all as will be described in detail below.

In the accompanying drawings:

Figure 6 is a cross-sectional view taken on the line 6—6 of Figure 2;

Figure 7 is a cross-sectional view taken on the line 7—7 of Figure 2;

Figure 8 is an enlarged detail cross-sectional view of a portion of the recording unit showing the adjustable air gap and damping means in a different position from that shown in Figure 7;

Figures 9 and 10 are perspective views from opposite ends of the magnetizable poles of the combination unit;

A combination recording and reproducing unit is shown in full detail in Figures 1 to 15 inclusive, illustrating the compactness with which the subject matter of this invention may be embodied into a commercial unit. The actual combination unit of these figures is less than 2 inches in overall length, 3/4 inch in width, and 1 inch in height. Although this unit includes both a recording and a reproducing section it will be apparent to those skilled in the art, independent of and especially in the light of this disclosure, that each section may be built separately and used independently of the other. For example in dictation transcription machines the reproducing section can be built into a unit without a recording section and used as a complete unit. Likewise the recording section can be incorporated alone in a recording head for use on a machine which records only. It also follows that in machines where it is desired to have the recording and reproducing sections as separate units, although employed in the same machine, this may be done.

Figure 2:
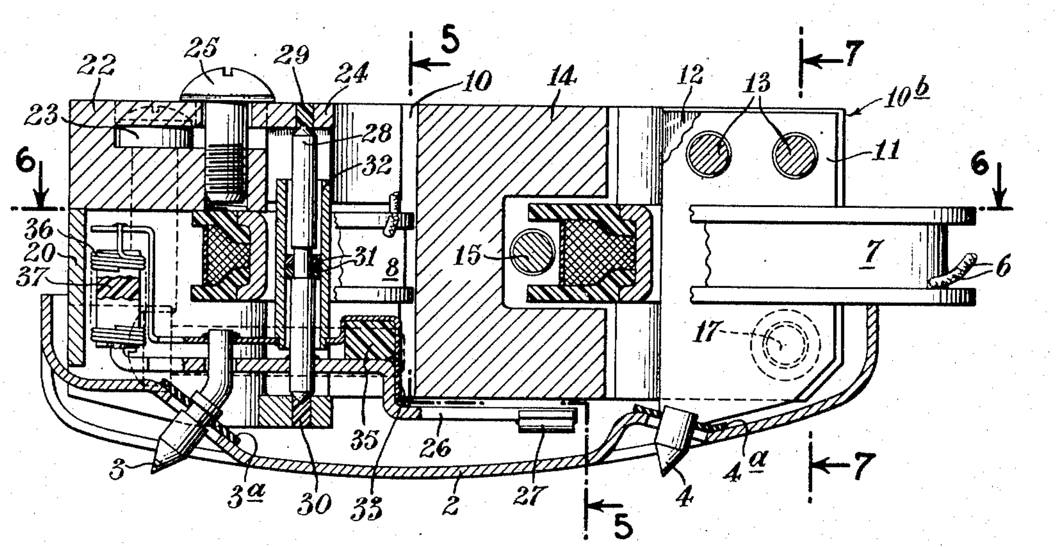
Figure 2 is a longitudinal, vertical, cross-sectional view through the unit of Figure 1.

This combination unit comprises a magnetic structure generally indicated at 1, which houses and supports all of the parts. A detachable cover 2 is provided which may be removably secured to the magnetic structure by means of a pair of dimples $2^a$ engaging recesses in the magnetic structure in an obvious manner. This cover, as is clear from Figure 2, is provided with inwardly dished aperture portions through which the reproducing stylus 3 and the recording stylus 4 project without interference from the cover. The enlarged openings through which the styli 3 and 4 project are sealed against the entry of dust by means of flexible washers $3^a$ and $4^a$ respectively which surround the styli.

The whole unit is adapted to be pivotally supported on a pivot pin, not shown, which is mounted on and cooperates with a plate, not shown, which can be attached to the unit by means of machine screws engaging the threaded apertures 16. The voice or signal coil for the reproducing section is shown at 8 having the signal supply leads 5. This coil is in the form of a flat spool of circular cross-section as is clear for example in Figure 2. The spool comprises a central tube and a pair of flanges of non-magnetic material on which the winding of the coil is mounted in a well known manner.

The signal coil 7 for the recording section which is similarly constructed but of rectangular form, as clearly shown in Figure 6, is provided with the leads 6.

The magnetic structure of the unit comprises a pair of magnetizable pole pieces 9 and 10, see Figures 9 and 10 for clear views thereof. These pole pieces are shaped to provide poles of U-shaped configuration, as shown at $9^a$ and $10^a$ and $9^b$ and $10^b$ respectively. As is clear from several of the figures (see Fig. 6), the coils 7 and 8 snugly fit in the recesses formed by these U-shaped poles. The pole pieces are assembled in parallel relation so that their transverse configuration intermediate the ends forms a compartment in which a permanent magnet 14 of generally cubical form is secured by means of a machine screw 15, which passes through the pole piece 9 and the magnet 14 and threadedly engages the pole piece 10. The magnet 14 can preferably be made of the modern alloys employed for permanent magnets to provide a sufficiently intense magnetization of the pole pieces.

As shown in Figure 2, the magnet 14 is of U-shape to provide room for the end of the coil 7 adjacent which the screw 15 passes through it. The pole pieces are also secured together by means of a pair of screws 13 (see Figs. 1, 2 and 7), which rigidly clamp between them the armature 11 of the recording section. Interposed between the upper end of the armature and the pole pieces are a pair of shims 12 so that an air gap for the armature is supplied at the lower end, as is clear from Figure 7. The armature is of plate-like formation, as is clear from Figure 2, and has the recording stylus 4 rigidly secured at the lower end, as by welding.

As is clear from Figures 7 and 8, the pole piece $10^b$ is provided with a threaded screw 17 which passes through a resilient bushing 18 lying in a hole in the armature 11. The end of the screw 17 is of reduced diameter and unthreaded and it is that end that lies in the bushing 18. By rotating the screw 17 clockwise the reduced end can be made to abut the adjacent portion of the pole piece $9^b$ and thereby exert a supporting force on the adjacent portions of the pole pieces $9^b$ and $10^b$ to increase the width of the air gap in which the lower end of the armature 11 operates. The resilient bushing 18 is of such length that when this air gap is of maximum length, as shown in Figure 7, the bushing will be completely relaxed. However, as the screw 17 is backed off permitting the air gap to decrease in length, the ends of the bushing are compressed by the pole pieces into a configuration somewhat like that shown in Figure 8, and the degree of deformation can be varied from the extreme positions shown in Figures 7 and 8 for a purpose later to be described.

Secured to the lefthand end of the magnetic assembly (see Fig. 3 for example) is a supporting block 20 of non-magnetic material which supports the vibratory system of the reproducing section. This block is attached to the magnetic structure by means of the screws 21 and a separate removable upper plate 22 of non-magnetic material is secured thereto by a pair of machine screws 23. This plate is slotted and provided with a tang 24 which lies between the upper sections of the pole pieces $9^a$ and $10^a$, as indicated in Figure 2. This tang provides a pivot point to be described later and the upper leaf left by the slot can be vertically adjusted by means of a screw 25 which passes freely through the leaf and threadedly engages the main body of the plate 22.

The vibratory system for the reproducer is clearly shown in Figure 11 and consists of a metal strip or main frame member 26 of non-magnetic material having secured at one end a cross bar 27 of magnetizable material which is of such length, as clearly shown in Figure 4, that its ends are adjacent the points of engagement of the magnet 14 with the pole pieces 9 and 10, for a purpose to be explained later.

Figure 3:
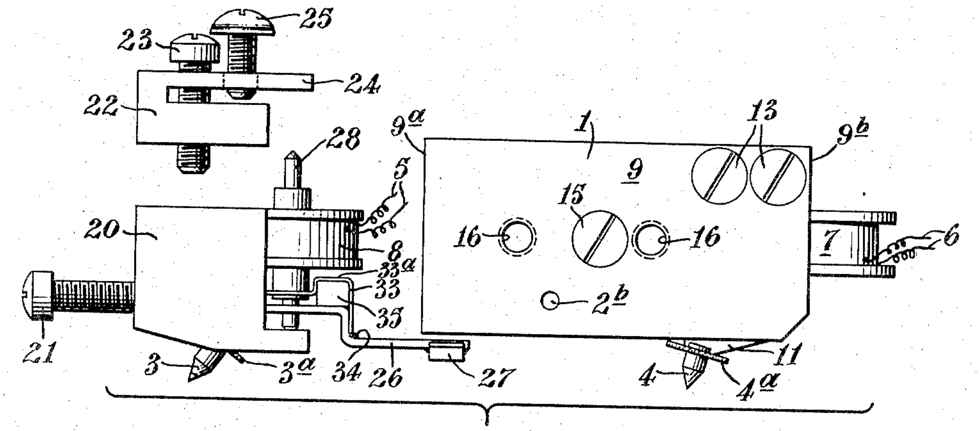
Figure 3 is a partially exploded side elevational view of the combination unit with some parts removed.

Secured to the frame member 26 and lying at right angles thereto is a pintle or shaft 28 having conical bearing ends, the upper one of which engages a resilient bushing 29 in the tang 24 and the lower end of which engages a resilient bushing 30 in the longitudinal extension of the block 20 (see Figs. 2 and 3). A resilient spring arm 33 is attached to the frame member 26 by welding, for example, as shown at 34 and its intermediate portion extends parallel to the intermediate portion of the frame member 26. Mounted on the spring member 33 is a tube 32 of magnetizable material which surrounds the pintle 28. Interposed between the tube 32 and the pintle 28 on a reduced portion of the pintle are one or more resilient bushings 31 which engage both of these members and serve to yieldably hold them in concentric relation. Interposed between the frame member 26 and the resilient member 33 is a block of resilient material 35, the function of which will be described later. The stem of the stylus 3 is welded to the spring member 33 and freely passes through an enlarged opening in the frame member 26. The portion $33^a$ of the resilient member at the region of the resilient block 35 is necked down, or reduced in width to lower its torsional rigidity.

Mounted on the upturned end of the member 26 is a block of resilient material 37 which is surrounded by a tightly coiled spring 36, the upper end of which is soldered or welded to the terminal end of the spring member 33. The lower end of the spring member is soldered or welded to the adjacent part of the member 26 (see Fig. 11). The purpose of this structure will be later described.

The longitudinal extension at the bottom of block 20 (see Figs. 14 and 15) is provided with a pair of short pintle rods or wires 40 which are covered with resilient sleeves 41. These covered pins lie on opposite sides of the end of the frame member 26 adjacent the magnet 14 for a purpose to be described later. It is noted, however, that while the magnetizable cross piece 27 and the covered pins 40 can be conjointly used, it is sufficient to use them alternatively. Thus, when the cross piece 27 is employed these covered pins are not necessary.

The operation of this device and the function of the various parts will be described before describing the modifications shown in Figures 16 to 21 inclusive, as the structural features thereof will then be more easily understood.

Figure 1:
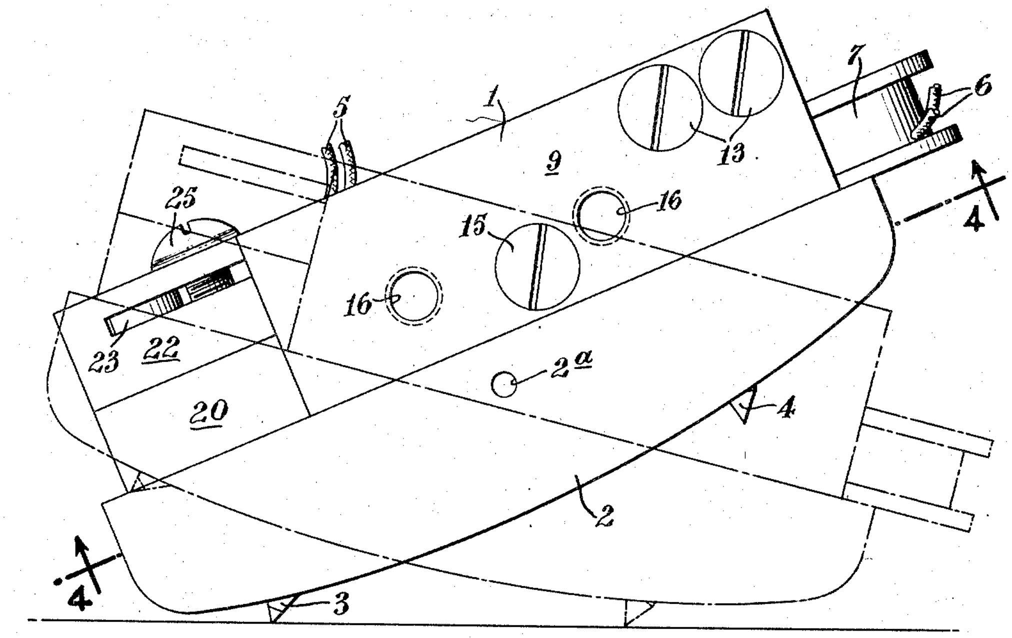
Figure 1 is a side elevational view of a combination unit containing both recording and reproducing sections.

With the parts assembled as shown for example in Figure 2, and with the unit pivotally mounted, it will be seen that it can be tipped in either direction, as illustrated in Figure 1 to bring either the stylus 3 or the stylus 4 into engagement with a record disc or a recording blank, respectively. Although pivotally mounted, this unit is otherwise rigidly mounted or fixed so that it cannot move with respect to the record during use. When positioned for recording it is apparent that if a signal representing the sounds to be recorded is applied to the coil 7 that the armature 11 will be caused to vibrate in response to the fluctuations in signal strength thereby imparting an engraving or embossing movement to the recording stylus 4. A novel feature of construction of the recorder section is provided in the adjustment screw 17 and the associated parts. This simple device provides an easy method of compensating for the structural variations within manufacturing tolerances which naturally occur in most production methods. Uniform electrical characteristics can be imparted by adjusting the air gap to the desired point of operation.

The resilient bushing 18 provides a method of attaining variable damping of the armature movements while at the same time adjustment of the air gap is effected. Reduction of the damping effect of the bushing 18 is effected at the time the length of the air gap is increased. Reduction of the damping tends to make the recorder more sensitive, but the lengthening of the air gap tends to make it less sensitive, thus making this damping adjustment less critical. It is possible by means of this simple mechanism, to adjust each of the mass produced devices to a condition of uniform sensitivity without requiring that in the manufacture of the parts they be held to extremely accurate tolerances, which, as is well known, would increase the expense of manufacture.

Figures 11, 12, 13, 14, 15:
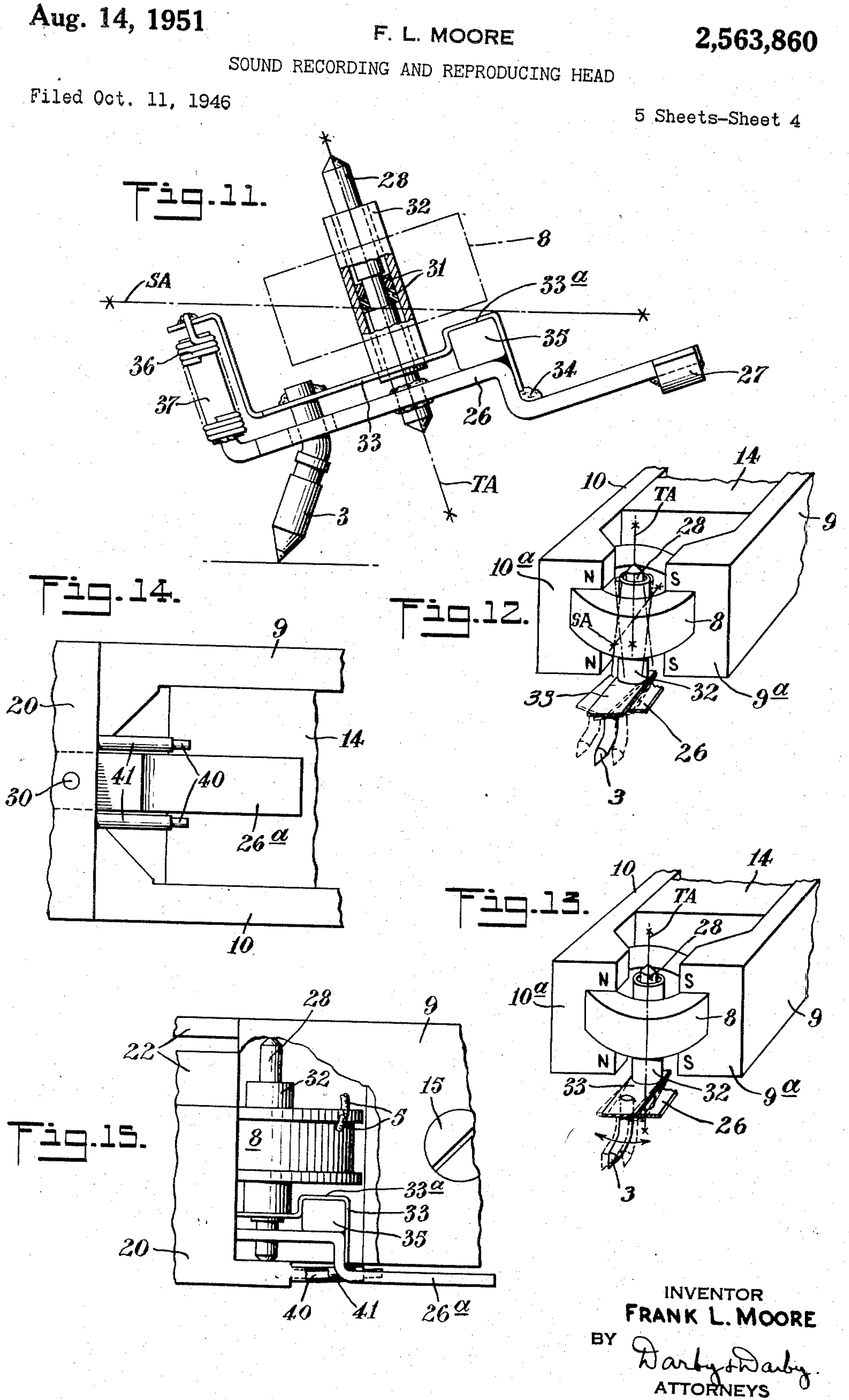
Figure 11 is a side elevational view of a vibratory system of the reproducing portion of the combination unit in reproducing position.
Figure 12 is a detail perspective view indicating how the vibratory system is capable of movement about the signal axis.
Figure 13 is a similar view showing movement only about the tracking axis.
Figure 14 is a bottom plan view of a portion of the unit showing damping and centering means for the vibratory system of the reproducing portion of the unit.
Figure 15 is a view showing the relationship of the parts with respect to the feature of Figure 14 as viewed from the side with some parts broken away and some parts in section.

In describing the operation of the reproducer section it is important to note, as indicated in Figure 11, that the vibratory system thereof has two axes of movement, one the tracking axis TA is coindent with the longitudinal axis of the shaft 28 which supports it. The other which is the signal axis SA is at a large angle with respect to the tracking axis. The mass of the parts and its distribution are so arranged in this structure that the signal axis is substantially parallel to the surface of the record when the unit is in reproduce position. In connection with the operation of this vibratory system it is noted that the bushing 31, preferably of resilient material, maintains the pintle shaft 28 concentrically spaced with respect to the tubular magnetizable armature 32 and also serves to introduce some damping of the relative movement therebetween. These bushings also aid in determining the signal axis and it may be noted that although two bushings are shown a single bushing can be used. This bushing is also effective in determining the vertical flexibility of the support for the stylus even though the primary determining factor in the vertical flexibility is in the spring member 33 itself. The resilient block 35 which is preferably of a sound-damping material, mounted under the necked in portion of the spring 33, is for damping purposes also and absorbs any high-frequency resonant effects in the unit which may occur due to the flexing (torsional and bending) of this member at the necked out portion $33^a$. It should be noted that the member 33 is of non-magnetic material, and indeed with the exception of the tube 32 all parts of the vibratory system are of non-magnetic material. The resilient member 37 which is preferably of a sound-damping material, completely fills the spring 36 and eliminates any objectionable resonance that may occur in the spring. The purpose of this spring is to aid in giving slight vertical flexibility to the stylus and to aid in operationally defining the signal axis.

Figures 4, 5:
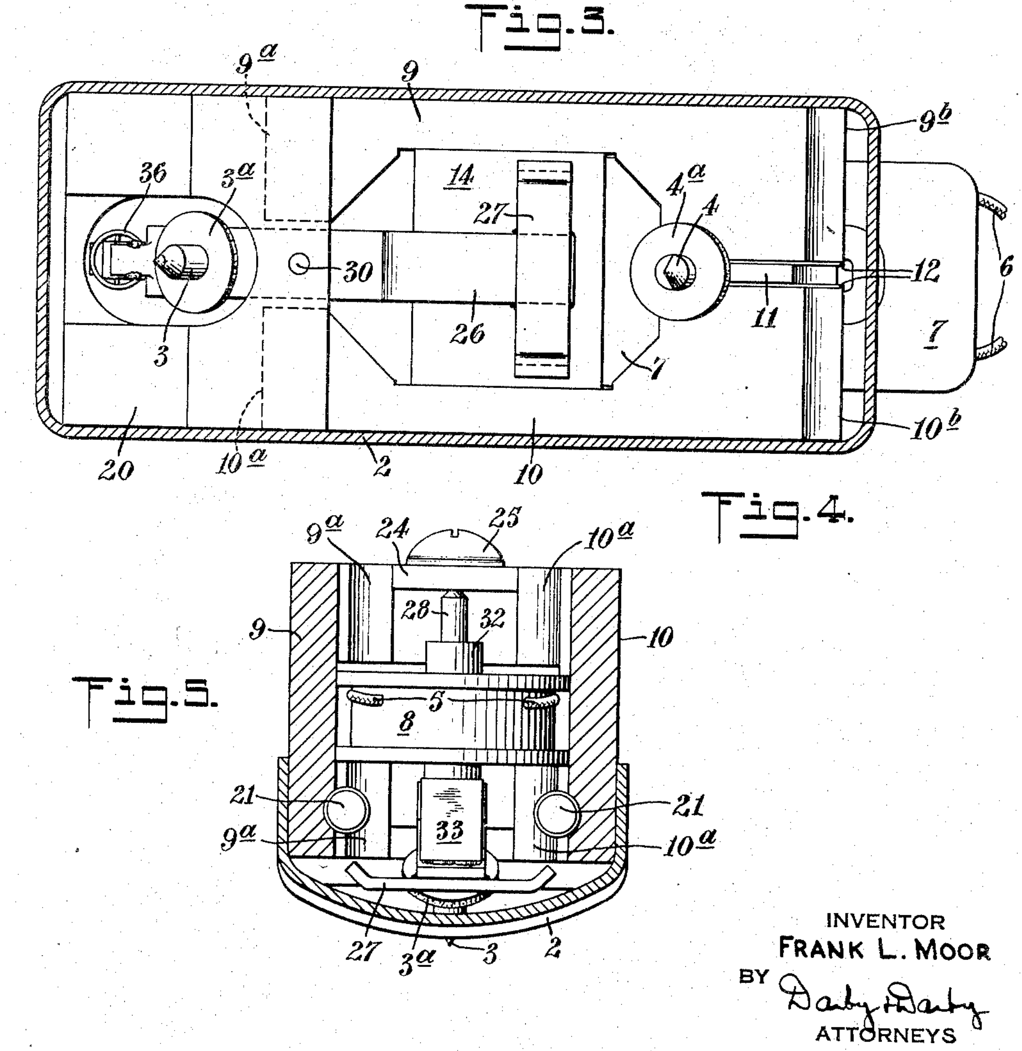
Figure 4 is a cross-sectional view taken on the line 4—4 of Figure 1.
Figure 5 is a cross-sectional view taken on the line 5—5 of Figure 2.

When the system is relaxed the vibratory unit is approximately centered with respect to the remainder of the unit by reason of the magnetizable cross bar 27 which has its ends turned inwardly, as clearly shown in Figure 5, in the region of the ends of the magnet 14 which are the points of strong leakage magnetic-field. As this bar is attached to the moving system of the reproducer it tends to hold the reproducer stylus in the central position. The magnetic forces which are present are not sufficiently strong to prevent the stylus from following the groove. Yet when the stylus is lifted from the record these forces are sufficiently strong to move the vibratory system to central position. At this point it may be noted that the resilient bushings 29 and 30, which are preferably of a sound-damping material, serve to prevent rattling of the system due to any looseness which may be present at the pivot points. The screw 25 serves to take up any excessive play at the pivot points.

In following the record groove the reproducer stylus is made to vibrate at the signal frequencies due to the modulations in the grooves. This vibration is transmitted to the magnetizable armature tube 32 and causes movement thereof in the air gap of the poles $9^a$ and $10^a$. This movement of the tube varies the flux linked with the coil and thereby the signal representative of the groove modulations is generated. The whole system does not vibrate about the shaft 28 at the signal frequencies because its mass is so selected and distributed that it cannot follow such high frequencies; instead, that part of the vibratory system including elements 3, 33 and 32 vibrates about the signal axis SA, as illustrated particularly in Figure 12.

The whole vibratory system, however, can follow the tracking forces, that is the mean guiding action of the groove, because of their very low frequency. Movements of the system in response to the tracking force are almost entirely about the tracking axis TA, as illustrated particularly in Figure 13. Thus since the tube 32 is concentric with the shaft 28 and sufficiently relatively fixed with respect thereto, it only rotates in the magnetic field as the system moves under the tracking forces. The result is that the flux in the air gap is not disturbed and no currents are generated in the coil due to this movement.

An important advantage of the conjoint movements just described is that the permanent magnet field structure and coils can be mounted rigidly against lateral movement.

Another important advantage of these conjoint movements is the provision of a control of the low-frequency response of the reproducer. If the moment of inertia of the whole vibrating system about the tracking axis is made sufficiently low, the lower-frequency signal components will cause some vibration about this axis, thus weakening the low-frequency response, as may be desirable under special circumstances.

The structure of the movable system of the reproducer shown in Figure 11 is capable of passing relatively low signal frequencies due to the relatively high moment of inertia, or effective mass present at the stylus point, and against which the signal force of the groove must operate in order to result in a signal generating motion in the armature. The effective mass at the stylus point is high by virtue of the fact that a considerable portion of its true mass is located further out from the pivot shaft 28 than is the stylus 3 itself. It will be seen, therefore, upon careful analysis, that there has been devised an exceedingly sensitive reproducer in which the vibratory system thereof is efficiently and correctly designed as to mass and distribution thereof which acting in cooperation with the damping elements thereof provides a system which can accommodate for the tracking forces without generating disturbing signals, while being quite sensitive and efficient in generating signals over the frequency range for which it has been devised. Its response at low frequencies can be brought down quite close to the frequency of the tracking forces without the introduction of any frequency component into the signal due to tracking forces.

At this point the centering mechanism of Figures 14 and 15 can be appropriately described. The lateral stops for the vibratory system comprising the bendable pins 40 and the resilient sleeves 41 are adjustable both with respect to the distance between them and with respect to the housing. Adjustment of the distance between them determines the degree of lateral freedom of the system for tracking, and adjustment with respect to the housing determines the proper positioning of the reproducing stylus with respect to the recording stylus so that the reproducing stylus can be made to contact the record when going from record to reproduce at a point a few grooves in back of the last groove recorded, and thus that portion can be repeated or transcribed by simply shifting the unit from recording to reproducing. These stops are sufficiently softer and appear to give superior performance over the magnetic centering bar arrangement 27, which is nevertheless a useful alternative.

The physical structures of the vibratory systems of Figures 16 to 21 inclusive, are included herein for the purpose of illustrating the wide possible range of variation in the physical structure of the reproducer vibratory system, an example of which has already been described in connection with Figure 11. These modifications also illustrate variations in the moment of inertia of the vibratory system about the tracking axis TA, to which previous reference has been made. The low-frequency response of the vibratory system to the signal forces is largely controlled by this moment of inertia or effective mass of the vibratory system. Thus, the modifications of these figures at one and the same time illustrate the possibility of structural variation and the possibility of changes in the moment of inertia of the system. As will be clear to those skilled in the art, the moment of inertia of the vibratory system of Figure 11 can be changed as desired to cover the same range of frequency response as can be covered by the various structures of Figures 16 to 21 inclusive.

Figures 16, 17, 18, 19, 20:
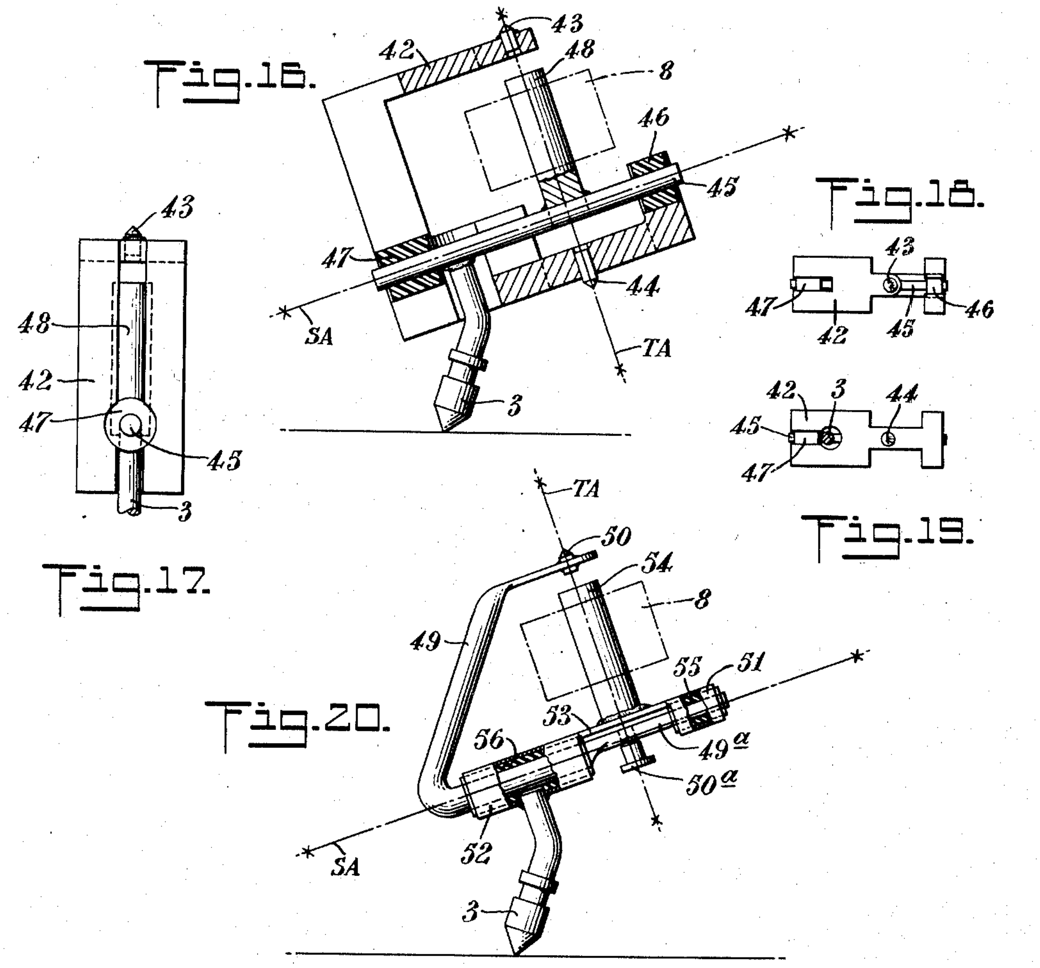
Figure 16 is a vertical, central, cross-sectional view of a modified form of vibratory system for the reproducing section embodying the principles of this invention in a different physical form.
Figure 17 is a lefthand elevational view of this structure.
Figure 18 is a top plan view thereof.
Figure 19 is a bottom plan view thereof.
Figures 20 and 21 show two additional modified forms of vibratory systems for the reproducing section embodying the principles of this invention.

Figures 16 to 19 inclusive show a modified form of vibratory system which can be used in the reproducer section of the combination unit. This structure comprises a non-magnetic frame 42 of generally U-shaped form and of non-magnetic material. It is slotted at the lefthand side, as shown in Figure 17, and its bottom arm is necked down intermediate the ends to form a T-shaped head, as shown in Figure 19. The upper and lower arms of this frame are provided with conical ended pivot pins 43 and 44. A supporting shaft 45 for the stylus 3 which is rigidly attached thereto is mounted in a pair of resilient bushings 46 and 47. These bushings merely seat in recesses in the frame as shown. The mass and distribution thereof in this system is such that the signal axis is at right angles to the tracking axis as illustrated. Mounted on shaft 45 at a point so as to be concentric with the axis of the pivot pins 43 and 44 is the magnetizable member 48 which corresponds to the armature 32 previously described. This vibratory system can be pivotally mounted in the bearings of tank 24 (Fig. 3) and the longitudinal extension on the block 20, and will follow in a generally similar manner to the previously described vibratory system.

In the arrangement of Figure 16 the mass of the entire vibratory system has been increased to a point where it is impossible for it to vibrate appreciably about the tracking axis TA even with extremely low signal frequencies. Thus even at these frequencies the vibration is mainly about the signal axis SA, moving the armature 48 through the air gap and generating a signal current in the coil 8.

Another modified vibratory system is shown in Figure 20. In this case the supporting frame is made from a light rod of non-magnetic material such as Phosphor bronze shaped into generally U formation to provide the frame 49. The upper arm of the frame is flattened and provided with a pivot pin 50. The other arm is flattened and provided either with a pivot pin or a recess to receive a pivot pin $50^a$ which can be mounted on or be a part of the longitudinal extension of block 20. The pivots 50 and $50^a$ are aligned on the tracking axis TA. A tubular support comprising the cylindrical portions 51 and 52 are connected by a narrow strap 53 and form seats for the resilient bushings 55 and 56 in which the lower arm of the frame is journaled. The stylus 3 is rigidly connected to the tubular portion 52 and the armature tube 54 is rigidly connected to the strap 53.

Figure 21:
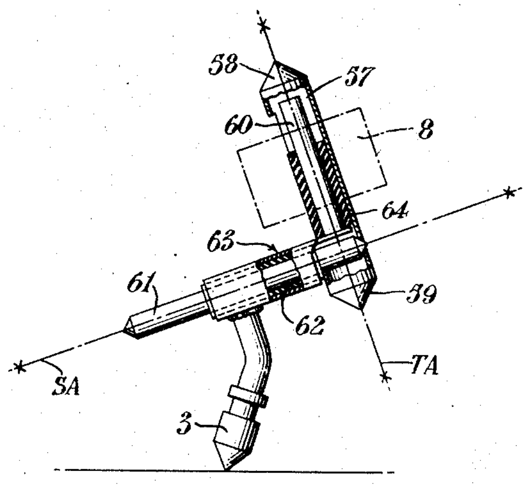

The structure illustrated in Figure 21 is one of very light mass in that the parts have been made as small as possible. In this structure the magnetizable armature 60 is secured to the end of a tube 63 of non-magnetizable material as by welding or the like. The tube 63 is mounted upon a shaft 61 and interposed between the two is a sleeve 62 of resilient material. The stylus 3 is rigidly secured to the tube 63. At 57 is a tubular shaft having the pivot points 58 and 59 at the end corresponding to the pivot points on the end of shaft 28 of the structure of Figure 11. This tubular shaft is of non-magnetic material and houses the magnetic armature 60. A resilient bushing surrounds the armature 60 to act as a damping means while permitting relative movement of the armature within the larger tubular shaft 57. One end of the shaft 61 is secured in any suitable manner to the tubular shaft 57. The conical ends of shaft 61 provide a ready means for mounting it in proper position, but they do not provide pivot points for the shaft as it does not turn in use. The other end of this shaft can be mounted in a recess in some adjacent part of the device such as the block 20. In this arrangement the parts 61, 62 and 63 are sufficiently loosely fitted so that the tube 63 and sleeve 62 can rotate on the shaft 61. In other words, the damping sleeve 62 fits the tube 63 sufficiently tightly so that they move together but is loose enough to rotate on the shaft 61. Of course, such rotation will cause the armature 60 to rock in the magnetic field and vary the flux thereof and generate a signal. On the other hand, rotation of the entire structure on the pivot points 58 and 59 in response to the tracking forces will merely cause the armature 60 to rotate on the axis of the tubular shaft 57 in the magnetic field and not vary the flux thereof.

In the arrangement of Figure 21, however, the moment of inertia of the entire system about the tracking axis TA has been reduced to a point where it actually begins to follow the modulations in the record groove representing the lower signal frequencies, and thus does not allow a movement of the armature 60 in the air gap and therefore does not generate a signal containing these low frequencies. The low-frequency response of the system is therefore determined by the moment of inertia of the system about the tracking axis. It is apparent therefore how the low-frequency signal response may be effectively controlled by changing the mass of this system.

It is emphasized that the mass of this vibratory system has been reduced to a point where it actually begins to follow at the lower signal frequencies and thus does not allow them to generate a signal in the coil. The low frequency response of the unit, and in fact all of the units, in accordance with this invention, is determined therefore by the moment of inertia of the vibratory system about the tracking axis and therefore the lower-frequency response may be effectively controlled by changing the mass of the system as well as the distribution thereof about the tracking axis.

A number of forms in which the subject matter of this invention can be embodied have been illustrated, but it is to be understood that the illustrated forms do not by any means exhaust the possibilities in this direction. As the principles of this invention can be embodied in other physical forms of devices, I do not desire to be strictly limited to the disclosure as represented by these embodiments, but rather by the scope of the claims granted me.

What is claimed is:

1. A sound reproducing unit having means for generating a magnetic field, a signal coil in said field, and a vibratory system for varying the flux distribution in said field comprising a vibratory unit including a stylus and a support therefor, said support having two intersecting axes of motion lying in a common substantially vertical plane at a predetermined finite angle to each other.

2. In the combination of claim 1, said support including a vertically resilient motion transmitting member to which the stylus is attached.

3. In a sound reproducing head the combination comprising a magnetized structure forming an air gap, a signal coil mouned in said air gap, an armature lying in said air gap, means for supporting said armature for rotation on its axis and for rotation on an axis at an angle thereto, said axes of rotation intersecting, and a stylus mounted on said means in spaced relationship with respect to said armature whereby forces applied to said stylus can independently and simultaneously effect rotary movement of said armature on both of said axes.

4. In a sound reproducing unit the combination comprising means for generating a magnetic field including pole pieces forming an air gap, a signal coil mounted in said air gap, an armature in said air gap having a longitudinal axis of rotation normally lying on the axis of said coil, a stylus, and means for rotationally supporting said stylus and armature on an axis which intersects said first axis with the stylus offset from the axis of said armature.

5. In the combination of claim 4, said supporting means being of very low mass, the effective mass thereof being greater than the actual mass and concentrated adjacent said stylus.

6. In the combination of claim 4, said supporting means being of very low mass, said supporting means including a member having vertical flexibility to which said stylus is rigidly attached.

7. In the combination of claim 4, said supporting means being of very low mass, said supporting means including a member having vertical flexibility to which said stylus is rigidly attached, and means for damping the vertical movements of said member having vertical flexibility.

8. In a sound reproducing unit, the combination comprising means for creating a magnetic field including pole pieces forming an air gap, a signal coil mounted in said air gap, a frame pivotally supported on the axis of said coil, an armature member supported by said frame so as to lie also on the axis of said coil, said member being arcuately movable with respect to said frame about a second axis, and a stylus connected with said member, said axes of said frame and said member intersecting.

9. In the combination of claim 8, means for resiliently holding said frame in a centered position.

10. In the combination of claim 8, magnetic means comprising a bar attached to said frame and cooperating with said means for creating a magnetic field for holding said frame normally in a centered position.

11. A vibratory unit for a sound reproducing machine comprising a support adapted for pivotal mounting on one axis of movement, a yielding member having spaced portions mounted on said support, said member being capable of bending and torsional movements, a magnetizible armature secured to said member on the pivotal axis of said support, and a stylus rigidly connected to said member intermediate said portions and offset laterally from said axis.

12. A vibratory system for a sound reproducing unit comprising a supporting member, a shaft secured to said member for pivotally supporting it for movement on a first axis, a yieldable arm secured to said member and adapted to bending and torsional movements, a magnetizible tubular armature secured to said yieldable arm and surrounding said shaft, and a stylus rigidly connected to said yieldable arm, torsional movements of said yieldable arm occurring on a second axis.

13. In the combination of claim 12, resilient means interposed between said shaft and armature for maintaining concentricity and damping relative movements therebetween.

14. In a vibratory unit of the type described the combination comprising a hollow support adapted for pivotal mounting on a first axis, a tubular support pivotally mounted on said hollow support, a stylus rigidly connected to said tubular support, a cylindrical armature lying in said hollow support and also secured to said tubular support, said angular support being rotatable on an axis at right angles to said first axis.

15. In a sound reproducing unit the combination comprising means for creating a steady magnetic field including pole pieces forming an air gap, a signal coil mounted in said air gap, a vibratory unit including an armature rotatably mounted in said air gap and lying normally concentric with said coil, means supporting said vibratory unit, and a stylus connected to said vibratory unit, said vibratory unit being supported for movements on two axes at an angle to each other and lying in a substantially vertical common plane, the mass thereof being proportioned and distributed so that said unit rotates on the axis of said coil and armature under the tracking forces encountered in reproduction and said armature rotates on said second axis in response to the record groove modulations applied to said stylus to vary the flux distribution of said coil.

16. In the combination of claim 15, said second axis being parallel to the record surface during reproduction.

17. In a sound reproducer unit the combination comprising fixed means for generating a magnetic field, a vibratory signal generating system, and means for mounting said signal generating system in said magnetic field comprising means constraining said system to movement about a neutral axis of said field in response to low frequency movements and means constraining said system to movement about an axis intersecting said field in response to higher frequency movements.

18. A reproducer unit for laterally modulated grooved records comprising a source of magnetic flux, a groove engaging stylus for receiving relatively low frequency range tracking movements and relatively higher frequency range signal movements substantially parallel to said tracking movements, a signal generating member connected with said stylus for movement in the field of said flux, and mounting means comprising means substantially constraining said member to movement about a neutral axis of said field in response to said low frequency range and means constraining said member to flux intercepting movement about another axis in response to said higher frequency range.

19. In a reproducer unit for laterally modulated grooved records the combination comprising a groove engaging stylus for receiving relatively low frequency range tracking movements and relatively higher frequency range signal movements substantially parallel to said tracking movements, a signal generating member connected with said stylus, and mounting means comprising means substantially constraining said member to pivotal movement about an axis passing therethrough in response to said low frequency range and means constraining said member to movement about another axis in response to said higher frequency range, said axes intersecting and lying in a substantially vertical plane.

20. In a reproducer unit for laterally modulated grooved records the combination comprising a groove engaging stylus for receiving relatively low frequency range tracking movements and relatively higher frequency range signal movements substantially parallel to said tracking movements, a signal generating member connected with said stylus, and mounting means comprising means substantially constraining said member to movement about an axis passing therethrough ineffective to produce signals in response to said low frequency range and means substantially constraining said member to another movement effective to produce signals in response to said higher frequency range, said axes intersecting and lying in a substantially vertical plane.

21. In a reproducer unit for laterally modulated grooved records the combination comprising a groove engaging stylus for receiving relatively low frequency range tracking movements and relatively higher frequency range signal movements substantially parallel to said tracking movements, a signal generating member connected with said stylus, and resilient mounting means comprising means substantially constraining said member to movement about an axis passing therethrough in response to said low frequency range and means constraining said member to movement about another axis in response to said higher frequency range, said axes intersecting and lying in a substantially vertical plane.

22. In a sound translating unit for laterally grooved records the combination comprising a groove engaging stylus for receiving relatively low frequency range tracking movement and relatively higher frequency range signal movements substantially parallel to said tracking movement, a signal translating member connected with said stylus, and mounting means comprising means constraining said member to movement about an axis passing therethrough in response to said low frequency range and means constraining said member to movement about another axis in response to said higher frequency range, said axes intersecting and lying in a substantially vertical plane.

FRANK L. MOORE.

REFERENCES CITED

The following references are of record in the file of this patent:

UNITED STATES PATENTS

| Number | Name | Date |
|---|---|---|
| 1,744,047 | Keller | Jan. 21, 1930 |
| 1,830,801 | McClatchie | Nov. 10, 1931 |
| 1,831,589 | Cloud | Nov. 10, 1931 |
| 1,835,073 | McClatchie | Dec. 8, 1931 |
| 1,870,446 | Foley | Aug. 9, 1932 |
| 1,905,669 | Yenzer | Apr. 25, 1933 |
| 2,113,907 | Sykes | Apr. 12, 1938 |
| 2,320,416 | Dally | June 1, 1943 |
| 2,388,116 | Bruderlin | Oct. 30, 1945 |
| 2,412,718 | Dally et al. | Dec. 17, 1946 |
| 2,422,817 | Baker | June 24, 1947 |
| 2,456,388 | Cornwell | Dec. 14, 1948 |

Certificate of Correction

Patent No. 2,563,860

August 14, 1951

FRANK L. MOORE

It is hereby certified that error appears in the printed specification of the above numbered patent requiring correction as follows:

Column 6, line 36, for "coindent" read *coincident*; column 8, line 31, for "softer" read *soft*; column 11, line 65, for "angular" read *tubular*; and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*